(12) United States Patent
Zhang et al.

(10) Patent No.: US 9,970,956 B2
(45) Date of Patent: May 15, 2018

(54) INERTIAL SENSOR

(71) Applicant: Hitachi Automotive Systems, Ltd., Hitachinaka-shi, Ibaraki (JP)

(72) Inventors: Yuhua Zhang, Tokyo (JP); Heewon Jeong, Tokyo (JP); Kiyoko Yamanaka, Tokyo (JP); Masahide Hayashi, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 645 days.

(21) Appl. No.: 13/930,011

(22) Filed: Jun. 28, 2013

(65) Prior Publication Data

US 2014/0007685 A1    Jan. 9, 2014

(30) Foreign Application Priority Data

Jul. 6, 2012   (JP) ................. 2012-152012

(51) Int. Cl.
*G01P 15/12*   (2006.01)
*G01P 15/08*   (2006.01)
*G01P 15/125*  (2006.01)

(52) U.S. Cl.
CPC ........ *G01P 15/125* (2013.01); *G01P 15/0802* (2013.01); *G01P 2015/0831* (2013.01)

(58) Field of Classification Search
CPC ......... G01P 2015/0831; G01P 15/0802; G01P 15/02; G01P 15/15; G01P 15/125; B81B 2201/0228; B81B 2201/0235; H01L 2924/15788; H01L 2924/19105; H01L 2924/01027; H01L 2924/07811;
(Continued)

(56) References Cited

U.S. PATENT DOCUMENTS

| 8,539,836 B2* | 9/2013 | McNeil .............. G01P 15/125 73/514.32 |
| 2003/0159513 A1* | 8/2003 | Nagahara .............. B81B 7/0006 73/514.16 |

(Continued)

FOREIGN PATENT DOCUMENTS

| JP | 2000-19198 A | 1/2000 |
| JP | 2008-544243 A | 12/2008 |

(Continued)

*Primary Examiner* — Peter Macchiarolo
*Assistant Examiner* — Irving A Campbell
(74) *Attorney, Agent, or Firm* — Crowell & Moring LLP (57) ABSTRACT

A movable part rotates about a rotation axis, which passes through a support, when an inertial force in a detecting direction is applied to an inertial sensor. The movable part includes a first region and a second region displaced in a direction opposite to a direction of the first region when the inertial force is applied. A second substrate includes first and second detection electrodes opposed to the first and second regions, respectively. The first detection electrode and the second detection electrode are provided symmetrically with respect to the rotation axis. A cavity is provided symmetrically with respect to the rotation axis. In a direction perpendicular to the detecting direction and a direction in which the rotation axis extends, a length from the rotation axis to an end of the first region and a length from the rotation axis to an end of the second region are different.

7 Claims, 7 Drawing Sheets

(58) Field of Classification Search
CPC . H01L 2224/24226; H01L 2224/48699; H01L 2224/8592; H01L 2224/24227; H01L 2224/48095; H01L 2224/484; H01L 2224/48799; H01L 2224/73215; H01L 2224/85; H01L 2224/85399; H01L 23/293; H01L 23/295; B32B 27/08; Y10T 29/4913; Y10T 29/49155; B81C 2203/0145
USPC .......... 257/E21.504, E23.124, E21.502, 678; 438/127, 126, 106; 73/514.28, 514.32; 324/167

See application file for complete search history.

(56) References Cited

U.S. PATENT DOCUMENTS

| | | | |
|---|---|---|---|
| 2007/0000323 A1 | | 1/2007 | Kuisma |
| 2009/0031809 A1 | | 2/2009 | Lin et al. |
| 2010/0139401 A1 | * | 6/2010 | Schwarzelbach ... G01P 15/0802 73/514.32 |
| 2011/0291644 A1 | * | 12/2011 | Kanemoto .......... G01P 15/0802 324/162 |

FOREIGN PATENT DOCUMENTS

| | | |
|---|---|---|
| JP | 2010-536036 A | 11/2010 |
| WO | WO 00/00832 A1 | 1/2000 |

\* cited by examiner

INERTIAL SENSOR

This application claims the priority of Japanese Patent Application No. JP 2012-152012, filed Jul. 6, 2012, the disclosure of which is expressly incorporated by reference herein in its entirety.

BACKGROUND OF THE INVENTION

1. Field of the Invention

The present invention relates to an inertial sensor.

2. Background Art

An inertial sensor manufactured by a machining technique of micro electro mechanical systems (MEMS) detects displacement of a movable part in order to measure an inertial force. The inertial sensor can measure an inertial force such as acceleration, an angular velocity, or angular acceleration by converting the displacement into an electric signal and processing the electric signal with an electronic circuit. In particular, a capacitance type inertial sensor detects the displacement as a change in the capacitance between a fixed detection electrode and a movable electrode. In the following explanation, a direction which is orthogonal to a principal plane of a substrate layer in which an elastic beam and a movable part are to be machined is referred to as an out-of-plane direction. For example, acceleration acting in the out-of-plane direction is referred to as out-of-plane acceleration.

In order to detect the acceleration in the out-of-plane direction, it is necessary to shift the center of gravity of the movable part from a rotation axis. An example of an inertial sensor having such a movable part is disclosed in JP-T-2010-536036 (the term "JP-T" as used herein means a published Japanese translation of a PCT patent application) (Patent Literature 1). In FIG. 1 of Patent Literature 1, lengths from the rotation axis to respective left and right ends of the movable part are set to different lengths. As a result, the center of gravity of the movable part is shifted from the rotation axis. On the other hand, for example, in FIG. 3 of Patent Literature 1, a part of the movable part is removed asymmetrically with respect to the rotation axis by etching to open a hole (the opened hole is referred to as "aperture") to shift the center of gravity from the rotation axis while keeping the lengths from the rotation axis to the respective left and right ends of the movable part the same. In both the configurations of Patent Literature 1, an electrode is provided under the movable part. JP-T-2008-544243 (Patent Literature 2) is a literature similar to Patent Literature 1. For example, FIG. 3 discloses the configuration in which apart of the movable part is removed asymmetrically with respect to the rotation axis by etching while keeping the lengths from the rotation axis to the respective left and right ends of the movable part the same.

Another example of the acceleration sensor that detects acceleration in the out-of-plane direction is described in JP-A-2000-19198 (Patent Literature 3). Patent Literature 3 discloses a technique for providing a plurality of sub-supporting supports asymmetrically with respect to a rotation axis and suppressing an influence due to distortion of upper and lower substrates of a movable part. However, in Patent Literature 3, the movable part is configured asymmetrically with respect to the rotation axis. It is unclear how the center of gravity is shifted from the rotation axis.

As another related art, in recent years, a manufacturing process employing a transfer mold process for cost reduction in packaging an inertial sensor attracts attention. The transfer mold process is a manufacturing process explained below. First, an MEMS element, an LSI electronic circuit, and a lead frame are set in a mold and, then, warmed resin is filled in the mold at high pressure of about 5 to 20 MPa. The resin is cooled and solidifies to be a mold resin package for fixing the MEMS element, the LSI electronic circuit, and a leader line. The transfer mold process has higher mass productivity than a process employing a ceramic package in the past and is expected to be an effective process in reducing manufacturing costs for the inertial sensor.

In the MEMS element of the inertial sensor, the movable part is encapsulated in a cavity at the atmospheric pressure or in a vacuum. If the transfer mold process is applied to such an MEMS element, when the resin is filled in the mold at high pressure, the high pressure is applied to the MEMS element as well. Then, since a difference between internal and external pressures of the element is large, the cavity of the element is deformed. The coefficient of thermal expansion of a material (silicon, etc.) forming the MEMS element is different from the coefficient of thermal expansion of the resin. Therefore, the element is deformed when heat is absorbed and emitted in the transfer mold process. Further, the formed mold resin package has a characteristic to expand by absorbing heat and humidity and contract by emitting heat and drying. Therefore, the MEMS element is deformed depending on fluctuation in an environment in which the mold resin package is set.

As explained above, in the inertial sensor employing the transfer mold process, various factors of deformation are conceivable. Problems explained below occur because of the deformation.

Asymmetrical Distortion

First, a problem of asymmetrical distortion is explained.

When the configuration in which the lengths from the rotation axis to the ends of the movable part are changed (FIG. 1 of Patent Literature 1) and the configuration in which a part of the movable part is asymmetrically removed (FIG. 3 of Patent Literature 1) are compared, the inertial sensor having the former configuration has higher sensitivity under the same conditions. This is because, whereas, in the latter configuration, a portion where the aperture is formed in the movable part is a useless region not contributing to detection of an inertial amount, in the former configuration, the useless region is absent in the movable part. Further, in general, an effect of shifting the center of gravity is larger when the lengths to the ends of the movable part are changed to shift the center of gravity than when the aperture is formed to shift the center of gravity. Therefore, in the former configuration, it is possible to more largely change the position of the movable part having the same mass. As a result, the inertial amount can be detected at higher sensitivity.

A detection electrode opposed to the movable part is desirably provided on a substrate above the movable part. This is because a change is the capacitance in the MEMS element is extracted by wire bonding and transmitted to an LSI, when the detection electrode is provided above the movable part, it is easier to draw around the leader lines than when the detection electrode is provided below the movable part.

Figure 7:
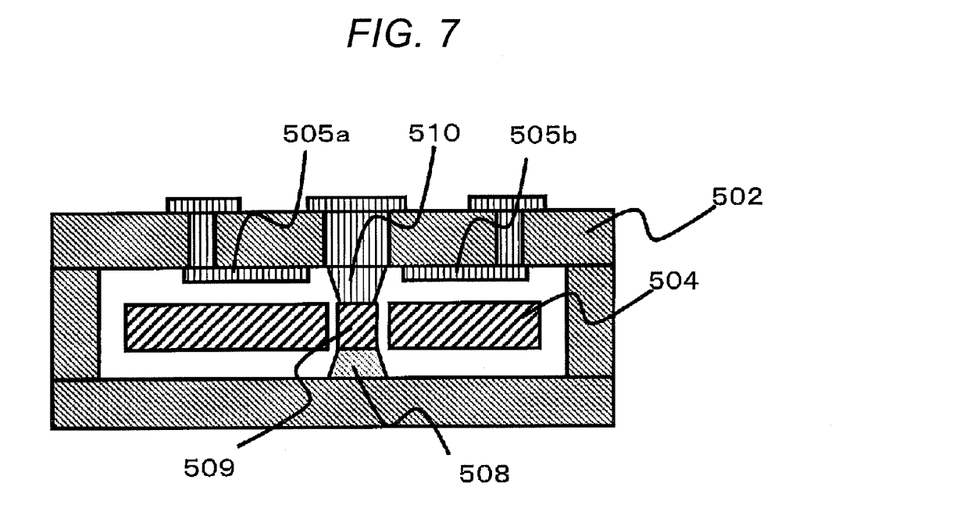
FIG. 7 is a sectional view of an inertial sensor in the past.

However, when a process for applying high pressure such as the transfer mold process is applied to an inertial sensor that satisfies such demands, asymmetrical distortion occurs in the detection electrode. The asymmetrical distortion is explained with reference to FIGS. 7 and 8. In FIG. 7, the lengths from the rotation axis to the ends of the movable part are set different on the left and right and the lengths from the rotation axis to cavity ends are also set different on the left and right. Detection electrodes 505a and 505b are respectively provided above a movable part 504.

Figure 6:
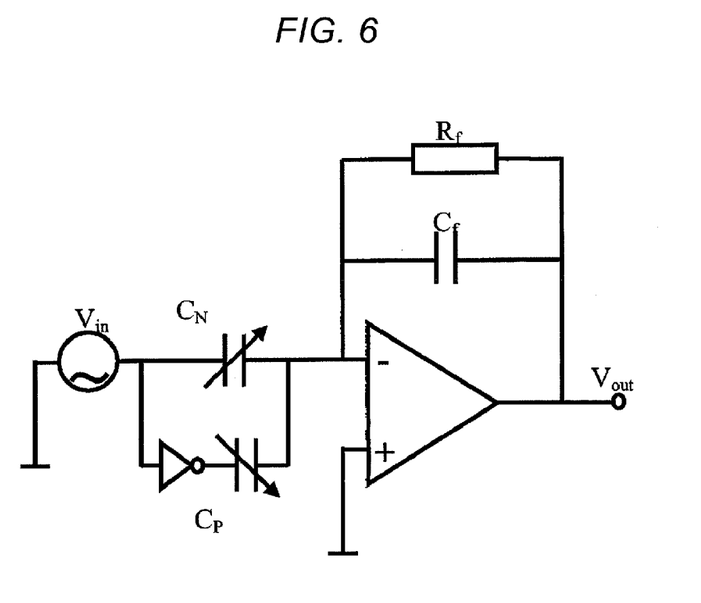
FIG. 6 is a figure of the principle of differential detection of the inertial sensor.
Figure 8:
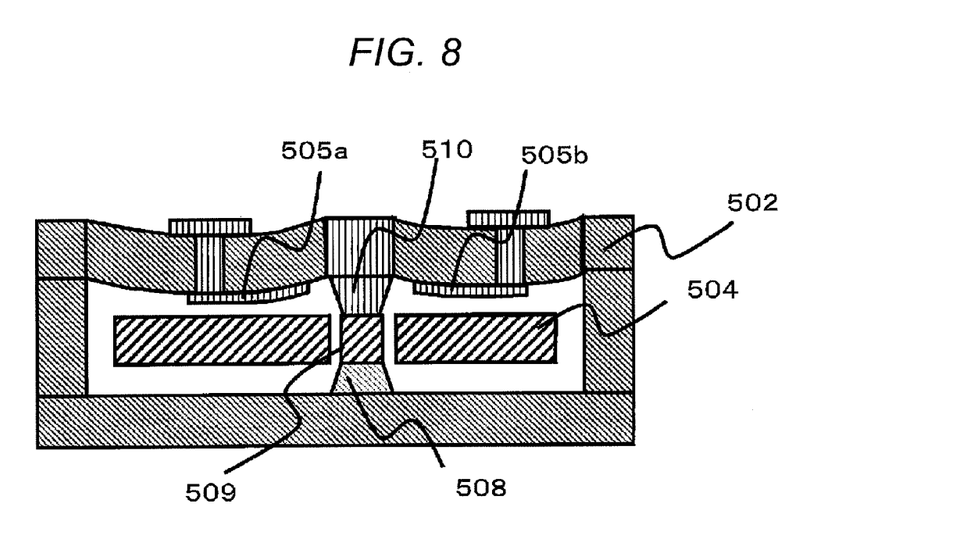
FIG. 8 is a sectional view of the inertial sensor in the past deformed by pressure.

When high pressure is applied to the MEMS element having such a configuration by the transfer mold process, the environment such as temperature and pressure fluctuates. Then, as shown in FIG. 8, upper substrates set in contact with the mold resin package show deformations different from each other. The detection electrodes 505a and 505b provided above the cavity respectively show different deformations. As a result, the capacitances between the detection electrodes and a movable electrode show changes different from each other. When the capacitances are detected by differential detection shown in FIG. 6, an offset occurs. This causes deterioration in sensor sensitivity. All the patent literatures neither describe nor indicate the problem of the asymmetrical distortion and means for solving the problem.

Distortion Due to High Pressure

Second, distortion due to high pressure is explained. In the transfer mold process, when the resin is filled, high pressure of about 5 to 20 MPa is applied to the MEMS element. In such a high-pressure process, a change in the detection electrode due to the distortion of the MEMS element is also large compared with the process in the past. Therefore, even if the inertial sensor is configured to be capable of reducing the influence of a relative change in the detection electrode due to the asymmetrical distortion, it is desirable that the inertial sensor can reduce an absolute change in the detection electrode as well. A support provided as in Patent Literature 3 is one of configurations for reducing such an absolute change. However, it is more suitable for the transfer mold process if the absolute change can be reduced by the configuration of the movable part as well. However, not only Patent Literature 3 but also all the patent literatures neither describe nor indicate such a configuration of the movable part.

SUMMARY OF THE INVENTION

The present invention has been devised in view of the problems and it is a first object of the present invention to provide an inertial sensor that can further reduce the influence of the asymmetrical distortion of an MEMS element. It is a second object of the present invention to provide an inertial sensor that can further reduce the influence of the distortion of the MEMS element due to high pressure.

Among means for solving the problems according to the present invention, representative means are illustrated below.

There is provided an inertial sensor including a movable part in a cavity surrounded by a first substrate, a second substrate provided above the first substrate, and a sidewall, the inertial sensor including a support provided in contact with the first substrate and the second substrate to support the movable part. The movable part is a movable part configured to rotate about a rotation axis, which passes through the support, when an inertial force in a detecting direction is applied to the inertial sensor. The movable part includes a first region and a second region displaced in a direction opposite to a direction of the first region when the inertial force is applied. The second substrate includes a first detection electrode opposed to the first region and a second detection electrode opposed to the second region. The first detection electrode and the second detection electrode are provided symmetrically with respect to the rotation axis. The cavity is provided symmetrically with respect to the rotation axis. In a direction perpendicular to the detecting direction and the rotation axis, the length from the rotation axis to an end of the first region and the length from the rotation axis to an end of the second region are different.

Alternatively, there is provided an inertial sensor including first and second movable parts in a cavity surrounded by a first substrate, a second substrate provided above the first substrate, and a sidewall, the inertial sensor including a support provided in contact with the first substrate and the second substrate to support the first movable part. The first movable part is a movable part configured to rotate about a rotation axis, which passes through the support, when an inertial force in a detecting direction is applied to the inertial sensor. The first movable part includes a first region connected to the second movable part via an elastic beam and a second region displaced in a direction opposite to a direction of the first region when the inertial force is applied. The second substrate includes a first detection electrode opposed to the first region and a second detection electrode opposed to the second region. The first detection electrode and the second detection electrode are provided symmetrically with respect to the rotation axis. The cavity is provided symmetrically with respect to the rotation axis.

Alternatively, there is provided an inertial sensor including a movable part in a cavity surrounded by a first substrate, a second substrate provided above the first substrate, and a sidewall, the inertial sensor including a first support provided in contact with the first substrate and the second substrate to support the movable part and a second support provided in contact with the first substrate and the second substrate and not in contact with the movable part. The movable part is a movable part configured to rotate about a rotation axis, which passes through the first support, when an inertial force in a detecting direction is applied to the inertial sensor. The movable part includes a first region and a second region displaced in a direction opposite to a direction of the first region when the inertial force is applied. The second substrate includes a first detection electrode opposed to the first region and a second detection electrode opposed to the second region. The first detection electrode and the second detection electrode are provided symmetrically with respect to the rotation axis. In a direction perpendicular to the detecting direction and the rotation axis, the length from the rotation axis to an end of the first region and the length from the rotation axis to an end of the second region are different.

Among effects of the present invention, a representative effect is illustrated below. In the inertial sensor, it is possible to further reduce the influence of asymmetrical distortion of an MEMS element. Alternatively, in the inertial sensor, it is possible to further reduce the influence of distortion of the MEMS element due to high pressure.

DESCRIPTION OF EMBODIMENTS

In the following explanation, for convenience of explanation, an X axis is set in a lateral direction (a left and right direction on the paper) among directions parallel to a substrate surface, a Y axis is set in a longitudinal direction among the directions parallel to the substrate surface, and a Z axis is set in a direction perpendicular to the substrate surface. When the axes are set in this way, an XY plane is referred to as "in-plane" as well and a Z-axis direction is referred to as "out-of-plane" as well. The Z-axis direction is a detecting direction of an inertial sensor according to the present invention. A Y-axis direction is a direction in which a rotation axis of the inertial sensor according to the present invention extends.

First Embodiment

Figure 1A:
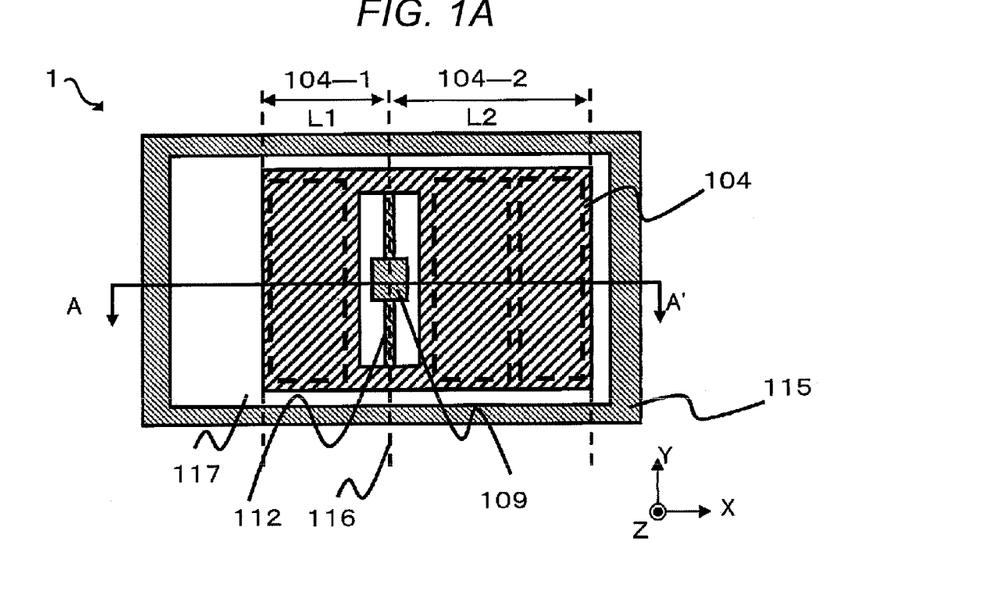
FIG. 1A is a plan view of an inertial sensor applied with the present invention.
Figure 1B:
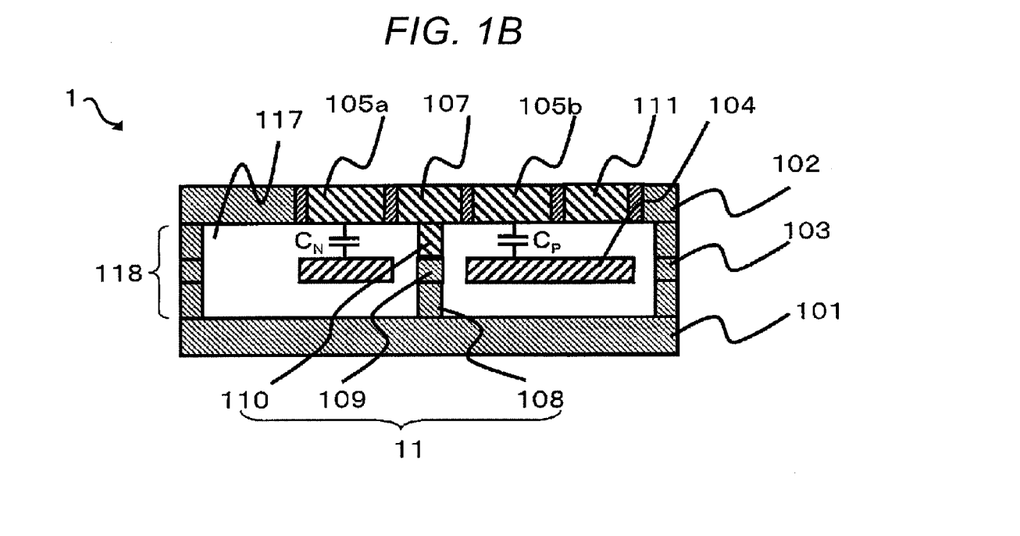
FIG. 1B is a sectional view of the inertial sensor applied with the present invention.

FIG. 1A is a sectional view of an MEMS element 1 in a first embodiment on the XY plane including a movable part 104. A portion of the movable part 104 opposed to detection electrodes 105a and 105b and a portion of the movable part 104 opposed to a diagnosis electrode 111 are indicated by dotted lines. FIG. 1B is a sectional view in an XZ plane of the MEMS element 1 shown in FIG. 1A taken along a line A-A'.

In the MEMS element 1 shown in FIGS. 1A and 1B, in a cavity 117 surrounded by a first silicon wafer substrate 101, a second silicon wafer substrate 102 provided above the first silicon wafer substrate 101, and a sidewall 118, the movable part 104 formed on a silicon wafer substrate 103, an elastic beam 112, a supporting section 109, and a frame body 115 are provided. In this way, an inertial sensor according to this embodiment is desirably formed by a three-layer structure including three silicon wafer substrates.

The supporting section 109 is provided in the center of the frame body 115. The cavity 117 is X-axis symmetrical or Y-axis symmetrical with respect to the supporting section 109. In particular, concerning an X-axis direction, the cavity 117 can also be referred to as being symmetrical with respect to a rotation axis 116 that passes the supporting section 109.

The elastic beam 112 is a torsion spring. The elastic beam 112 is extended from a set of side surface portions opposed to the supporting section 109 in the Y-axis direction.

The movable part 104 is an inertial mass section formed on the silicon wafer substrate 103. The movable part 104 is fixed to the supporting section 109 via the elastic beam 112. A predetermined voltage is applied to the movable part 104 via an electrode 107. As a result, the movable part 104 functions as a movable electrode. The detection electrodes 105a and 105b are formed on the substrate 102 opposed to the movable part 104. The detection electrodes 105a and 105b are provided symmetrically with respect to the rotation axis 116. In the movable part 104, a region opposed to the detection electrode 105a is referred to as a first region 104-1 and a region opposed to the detection electrode 105b is referred to as a second region 104-2. Then, when acceleration in a detecting direction is applied to the inertial sensor and the movable part 104 rotates, the first region 104-1 and the second region 104-2 are displaced in directions opposite to each other in the detecting direction.

Concerning the Y-axis direction, the movable part 104 is provided symmetrically with respect to the line A-A'. However, concerning the X-axis direction, the movable part 104 is provided asymmetrically with respect to the rotation axis 116. Specifically, a length L1 from the rotation axis 116 to an end of the first region and a length L2 from the rotation axis 116 to an end of the second region are different. By forming the movable part 104 in this way, the center of gravity of the movable part 104 is shifted from the rotation axis 116. On the other hand, the cavity 117 is provided symmetrically, contrary to the movable part 104, with respect to the rotation axis 116.

The movable part 104 forms capacitance $C_N$ between the movable part 104 and the detection electrode 105a and forms capacitance Cp between the movable part 104 and the detection electrode 105b. As explained above, the center of gravity of the movable part 104 is shifted from the rotation axis 116. Therefore, when an inertial force in the detecting direction (the Z-axis direction) is applied to the inertial sensor, the movable part 104 rotates about the rotation axis 116. As a result, one of the capacitances $C_N$ and $C_P$ increases and the other decreases. In this way, displacement d of the movable part 104 caused by the inertial force is output in a form of capacitance C. A relation between the displacement d and the capacitance C is as indicated by Expression (1), where A represents an area of planar plates of the capacitances and ε represents a dielectric constant between the plates.

$$C = \varepsilon A/d \quad (1)$$

Figure 1C:
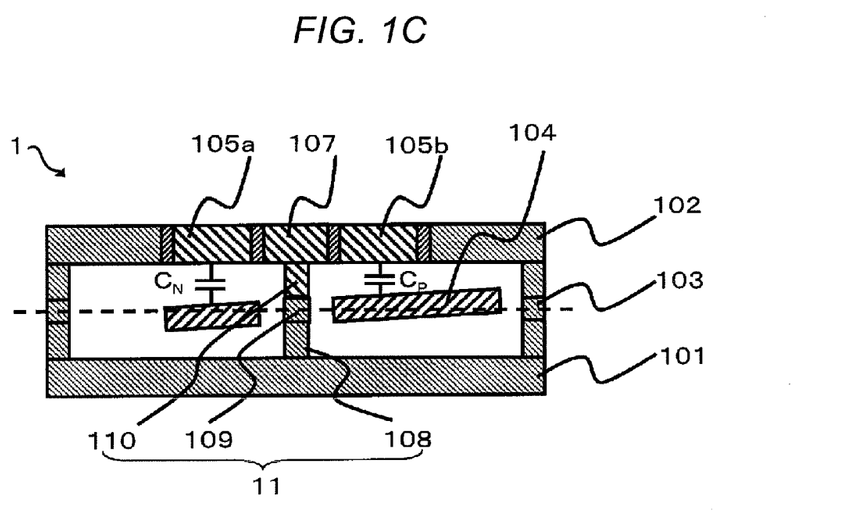
FIG. 1C is a sectional view of the inertial sensor applied with the present invention.

In FIG. 1C, in particular, the movable part 104 is displaced to increase the inter-plate distance of $C_N$ and reduce the inter-plate distance of C. In this case, the capacitance of $C_N$ decreases and the capacitance of $C_P$ increases. On the other hand, when an inertial force in the opposite direction is applied, the capacitance of $C_N$ increases and the capacitance of $C_P$ decreases. Therefore, it is possible to detect the magnitude and the direction of the inertial force applied to the inertial sensor by measuring $C_N$ and $C_P$ using a differential detection circuit shown in FIG. 6.

Further, when the diagnosis electrode 111 is formed on the silicon wafer substrate 102, it is also possible to impart a self-diagnosis function to the inertial sensor. The diagnosis electrode 111 is an electrode formed on the substrate 102, arranged in a position opposed to an asymmetrical portion of the movable part 104, and used during a diagnosis of the inertial sensor. The self-diagnosis function is a function used as an initial diagnosis function of the inertial sensor. Specifically, before the inertial force is actually applied from the outside, a predetermined voltage is applied to the diagnosis electrode 111 to rotate the movable part 104 with an electrostatic force. By detecting displacement of the movable part 104 due to the rotation as a change in capacitance via the detection electrodes, it is possible to confirm that the movable part 104 of the inertial sensor is not locked. Since the diagnosis electrode 111 is provided in this way, it is possible to provide a more reliable inertial sensor.

A method of manufacturing the inertial sensor in this embodiment is explained. In the manufacturing method in this embodiment, it is assumed that the MEMS element 1 is machined on an SOI (Silicon On Insulator) substrate using a machining technique such as photolithography or DRIE (Deep Reactive Ion Etching).

The movable part 104 is supported by a supporting section 108 set in contact with the substrate 101, a supporting section 110 set in contact with the substrate 102, and the supporting section 109 provided on the substrate 103. The supporting section 108 and the supporting section 110 are respectively joined to the supporting section 109 by silicon-silicon joining. The supporting section 108, the supporting section 109, and the supporting section 110 are respectively provided side by side in the Z-axis direction to form a support 11 set in contact with the silicon wafer substrates 101 and 102. The support 11 is formed by only the silicon-silicon joining between the silicon wafer substrates. Therefore, the support 11 is formed by joining of materials having the same coefficient of thermal expansion. It is possible to suppress deformation in the joining.

The detection electrodes 105a and 105b, the electrode 107, and the self-diagnosis electrode 111 are formed by silicon-doping the silicon wafer substrates 102 and 103 and using a through-electrode technique. The through-electrode technique is a technique for cutting a groove around each electrode using dry etching and thereafter forming an insulating film at high temperature and filling the groove with an insulating material. The maximum thickness of an oxide film ($SiO_2$), which can be formed on a silicon wafer, is usually about 2 μm. Therefore, the maximum value of the width of the groove is about 4 μm of the oxide film formed from both sides. On the other hand, a limit of a ratio of the width and the depth of the groove in the silicon dry etching is, for example, about 1:25. Therefore, an upper limit of the depth of the groove, i.e., the thickness of the silicon wafer substrates 102 and 103 is 100 μm. The numerical values described above are examples and are changed depending on a process. However, the thickness of the silicon wafer substrates is regulated by the thickness of the oxide film and the silicon dry etching. Therefore, the thickness of the silicon wafer substrates cannot be arbitrarily increased. Therefore, a structure for securing strength using a support or the like is necessary. Since the detection electrodes 105a and 105b, the electrode 107, and the self-diagnosis electrode 111 formed by the through-electrode technique are provided in the silicon wafer substrate 102 in the upper part, it is possible to extract signals from the electrodes without providing other metal electrodes or the like.

Figure 2:
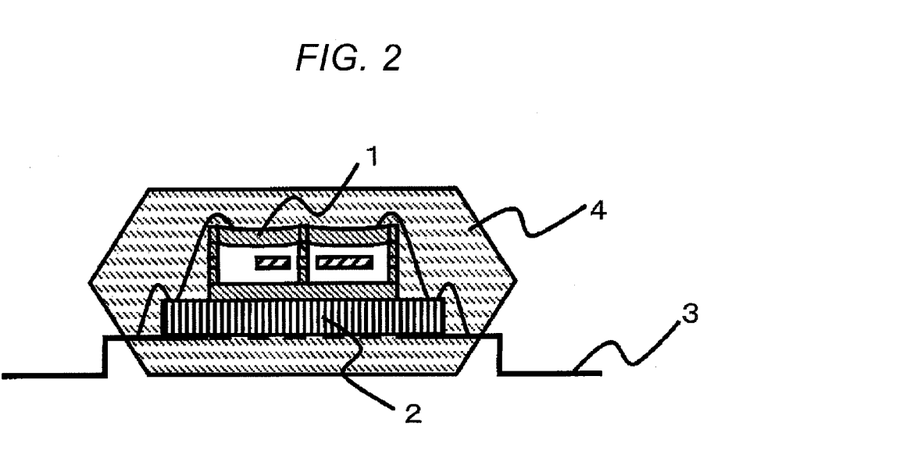
FIG. 2 is a sectional view of the inertial sensor applied with the present invention.

The structure of the inertial sensor after the application of the transfer mold process is explained. The MEMS element 1 is fixed to an upper part of an LSI electronic circuit 2 by an adhesive or the like. The MEMS element 1 and the LSI electronic circuit 2 fixed to each other is fixed to a lead frame 3. Thereafter, the MEMS element 1, the LSI electronic circuit 2, and the lead frame 3 are electrically connected by wire bonding and mounted on a mold in the transfer mold process. When resin is filled in the mold at high pressure and the mold is removed after the resin is cooled, a mold resin package is formed and a structure shown in FIG. 2 is obtained.

As explained above, the inertial sensor according to this embodiment is an inertial sensor including the movable part 104 provided in the cavity 117 surrounded by the first substrate 101, the second substrate 102 provided above the first substrate 101, and the sidewall 118. The inertial sensor includes the support 11 (the supporting sections 108 to 110) provided in contact with the first substrate 101 and the second substrate 102 to support the movable part 104. The movable part 104 is a movable part configured to rotate about the rotation axis 116, which passes through the supporting sections, when the inertial force in the detecting direction (the Z-axis direction) is applied to the inertial sensor. The movable part 104 includes the first region 104-1 and the second region 104-2 displaced in a direction opposite to a direction of the first region 104-1 when the inertial force is applied. The second substrate 102 includes the first detection electrode 105a opposed to the first region 104-1 and the second detection electrode 105b opposed to the second region 104-2. The first detection electrode 105a and the second detection electrode 105b are provided symmetrically with respect to the rotation axis 116. The cavity 117 is provided symmetrically with respect to the rotation axis 116. In the direction (the X-axis direction) perpendicular to the detecting direction and a direction in which the rotation axis 116 extends, the length L1 from the rotation axis 116 to the end of the first region 104-1 and the length L2 from the rotation axis 116 to the end of the second region 104-2 are different.

With such a configuration, in the inertial sensor according to this embodiment, the lengths from the rotation axis to both the ends of the movable part are changed and the detection electrodes are provided on the substrate above the movable part. Therefore, the more preferred MEMS element configuration described in the summary is realized by the inertial sensor.

Further, in the inertial sensor according to this embodiment, the cavity is provided symmetrically with respect to the rotation axis. Therefore, when the cavity is deformed by an environmental change, the cavity is displaced symmetrically around the support. The detection electrodes are also displaced by the same degree according to the displacement of the cavity. As a result, even if the cavity is deformed, the displacements of the capacitances CN and CP can be set equal. Therefore, by subjecting the capacitance changes to signal processing in the differential detection circuit, it is possible to cancel the capacitance changes equivalent to the deformation of the cavity and reduce the influence due to the deformation of the cavity.

In the inertial sensor according to this embodiment, the length L2 of the second region 104-2 (the length from the rotation axis 116 to the end of the second region 104-2) is larger than the length L1 of the first region 104-1 (the length from the rotation axis 116 to the end of the first region 104-1). The second substrate 102 includes the diagnosis electrode 111 opposed to the second region 104-2 and used during a diagnosis of the inertial sensor.

With such a configuration, it is possible to provide a more reliable inertial sensor. In particular, it should be noted that the diagnosis electrode 111 is opposed to a portion of the second region 104-2 not opposed to the detection electrode 105b. That is, this region is a portion for shifting the center of gravity of the movable part 104 from the rotation axis 116 and is a portion functioning as a counter electrode for performing a self-diagnosis function. Therefore, with such a configuration, compared with the out-of-pane inertial sensor in the past, a chip area necessary for imparting the self-diagnosis function is reduced.

In the inertial sensor according to this embodiment, all of the first and second substrates (101 and 102) and the movable part 104 (i.e., the substrate 103 on which the movable part 104 is configured) are formed of silicon. With such a configuration, it is possible to suppress deformation in the joining compared with the inertial sensor in which the substrates and the movable part are formed of a plurality of materials. Further, it is possible to reduce interference of external electromagnetic wave noise by applying a voltage to the silicon wafer substrates.

Second Embodiment

A second embodiment is explained. Detailed explanation of components same as the components in the first embodiment is omitted. Differences from the first embodiment are mainly explained.

Figure 3A:
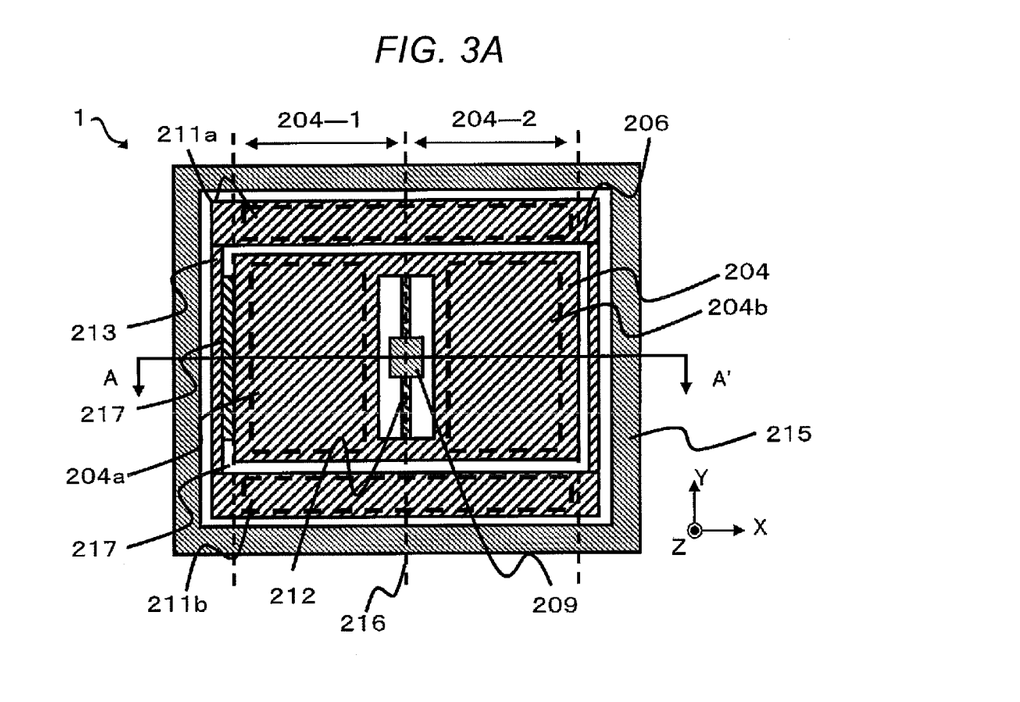
FIG. 3A is a plan view of the inertial sensor applied with the present invention.
Figure 3B:
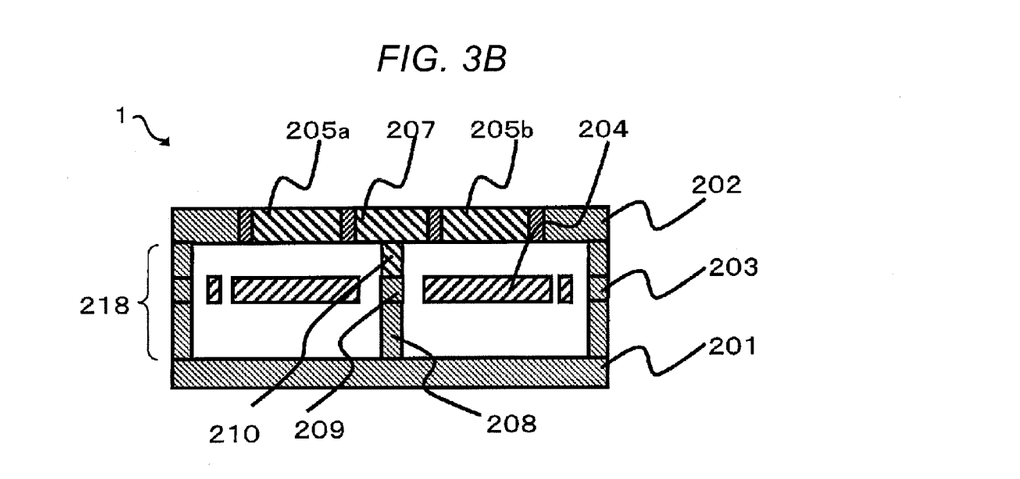
FIG. 3B is a sectional view of the inertial sensor applied with the present invention.

FIG. 3A is a sectional view in an XY plane of the MEMS element 1 according to this embodiment. A portion of a first movable part 204 opposed to detection electrodes 205*a* and 205*b* and a portion of a second movable part 206 opposed to diagnosis electrodes 211*a* and 211*b* are indicated by dotted lines. FIG. 3B is a sectional view in an XZ plane of FIG. 3A taken along a line A-A'.

In the MEMS element 1 according to this embodiment, in a cavity surrounded by a first silicon wafer substrate 201, a second silicon wafer substrate 202 provided above the first silicon wafer substrate 201, and a sidewall 218, the first movable part 204 and the second movable part 206 formed in a silicon wafer 203, elastic beams 212 and 213, a supporting section 209, and a frame body 215 are provided.

The supporting section 209 is provided in the center of the frame body 215. A cavity 217 is X-axis symmetrical and Y-axis symmetrical with respect to the supporting section 209. In particular, concerning the X-axis direction, the cavity 117 can also be referred to as being symmetrical with respect to a rotation axis 216.

The elastic beam 212 is a torsion spring same as the elastic beam 112 in the first embodiment. The elastic beam 213 is an elastic beam for displacing the second movable part 206 in the Z-axis direction with respect to the first movable part 204.

The first movable part 204 and the second movable part 206 are respectively inertial mass sections formed on the silicon wafer substrate 203. The first movable part 204 is fixed to the supporting section 209 via the elastic beam 212. In the first movable part 204, a side set in contact with the second movable part 206 via the elastic beam 213 is referred to as a first region 204-1 and a side not set in contact with the second movable part 206 is referred to as a second region 204-2. Then, it is possible to move the center of gravity of the entire movable parts further to the first region 204-1 side from the rotation axis 216 by an amount equivalent to the mass of the second movable part 206. That is, it is possible to realize, while forming the first movable part 204 and the second movable part 206 X-axis symmetrical, an inertial sensor capable of measuring an inertial force in the out-of-plane direction. In other words, it is possible to realize, while setting the distances from the rotation axis 216 to both ends of the first movable part 204 the same and setting the distances from the rotation axis 216 to both ends of the second movable part 206 the same, an inertial sensor capable of measuring an inertial force in the out-of-plane direction.

The detection electrodes 205*a* and 205*b* opposed to the first movable part 204 are provided on the second silicon wafer substrate 202 and provided symmetrically with respect to the rotation axis 216.

Figure 3C:
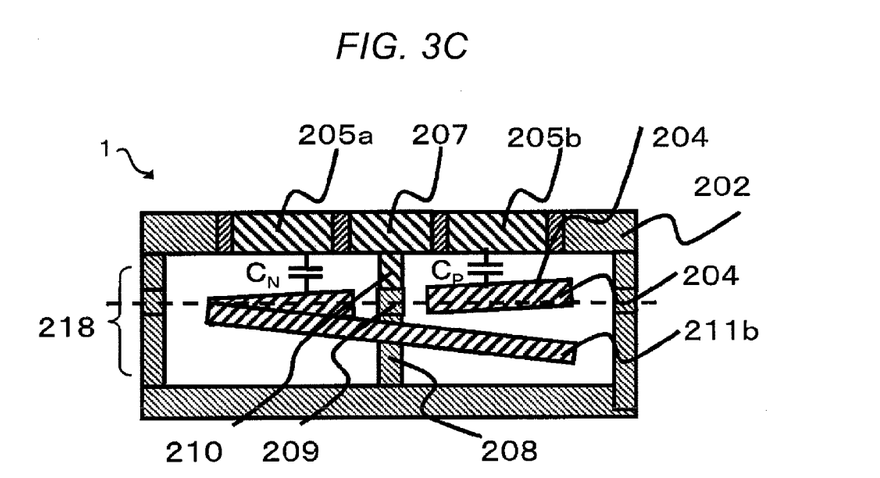
FIG. 3C is a sectional view of the inertial sensor applied with the present invention.

A sectional view of the MEMS element 1 shown in FIG. 3B applied with an inertial force in the detecting direction is shown in FIG. 3C. When FIG. 3C and FIG. 1C are compared, FIG. 3C is different from FIG. 1C in that the second movable part 206 is displaced as well. However, FIG. 3C is the same as FIG. 1C in that the movable electrodes 204*a* and 204*b* are formed in the first movable part 204 and the capacitances $C_N$ and $C_P$ are differentially detected. Therefore, it is possible to detect the magnitude and the direction of the inertial force according to a method same as the method in the first embodiment. That is, the second movable part 206 is an inertial mass section for shifting the center of gravity of the first movable part 204 from the rotation axis 216. A principle of measurement is the same as the principle in the first embodiment.

As explained above, the inertial sensor according to this embodiment is an inertial sensor including the first movable part 204 and the second movable part 206 provided in the cavity 217 surrounded by the first substrate 201, the second substrate 202 provided above the first substrate 201, and the sidewall 218. The inertial sensor includes the support 11 (supporting sections 208, 209, and 210) provided in contact with the first substrate 201 and the second substrate 202 to support the first movable part 204. The first movable part 204 is a movable part configured to rotate about the rotation axis 216, which passes through the supporting sections, when an inertial force in the detecting direction (the Z-axis direction) is applied to the inertial sensor. The first movable part 204 includes the first region 204-1 connected to the second movable part 206 via the elastic beam 213 and the second region 204-2 displaced in a direction opposite to a direction of the first region 204-1 when the inertial force is applied. The second substrate 202 includes the first detection electrode 205*a* opposed to the first region 204-1 and the second detection electrode 205*b* opposed to the second region 204-2. The first detection electrode 205*a* and the second detection electrode 205*b* are provided symmetrically with respect to the rotation axis 216. The cavity 217 is provided symmetrically with respect to the rotation axis 216.

With such a characteristic, in the inertial sensor according to this embodiment, effects same as the effects of the inertial sensor according to the first embodiment are attained. Moreover, the cavity is formed in the symmetrical structure to reduce the area of the element. That is, as in the first embodiment, compared with the inertial sensor of the type for providing the aperture shown in FIG. 3 of Patent Literature 1, the effect of shifting the center of gravity is further increased without providing a useless region. Further, compared with the first embodiment, since the symmetrical structure is realized as the entire movable parts, even if the cavity 217 is formed in the symmetrical structure, it is possible to efficiently utilize the inside of the cavity and reduce the area of the entire element.

Further, when a diagnosis electrode is provided in a region of the substrate 202 opposed to the second movable part 206, it is possible to use the second movable part 206 as a region for shifting the center of gravity from the rotation axis 216 and as a region functioning as an opposed electrode in using the self-diagnosis function.

A modification of FIGS. 3A to 3C is explained with reference to FIGS. 4A and 4B. Detailed explanation of components same as the components shown in FIGS. 3A to 3C is omitted. Differences from FIGS. 3A to 3C are mainly explained below.

Figure 4A:
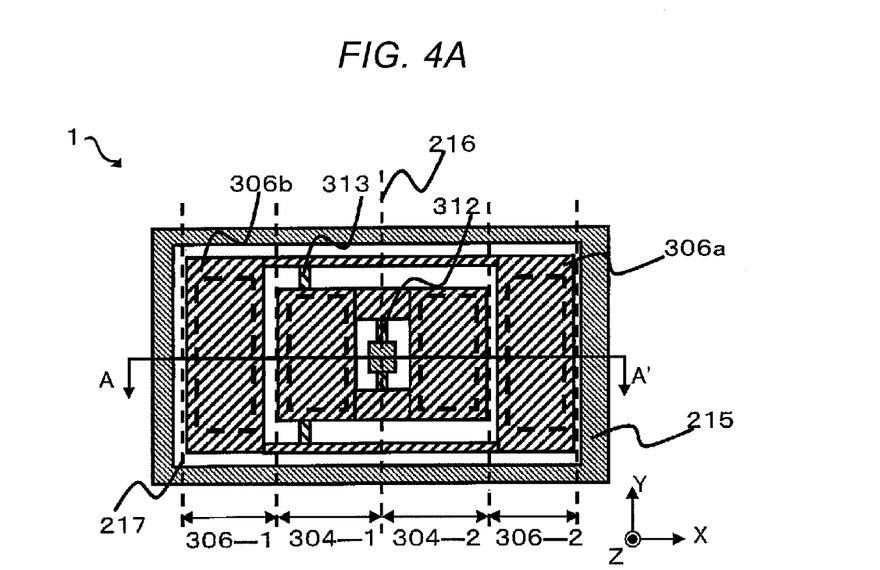
FIG. 4A is a plan view of the inertial sensor applied with the present invention.
Figure 4B:
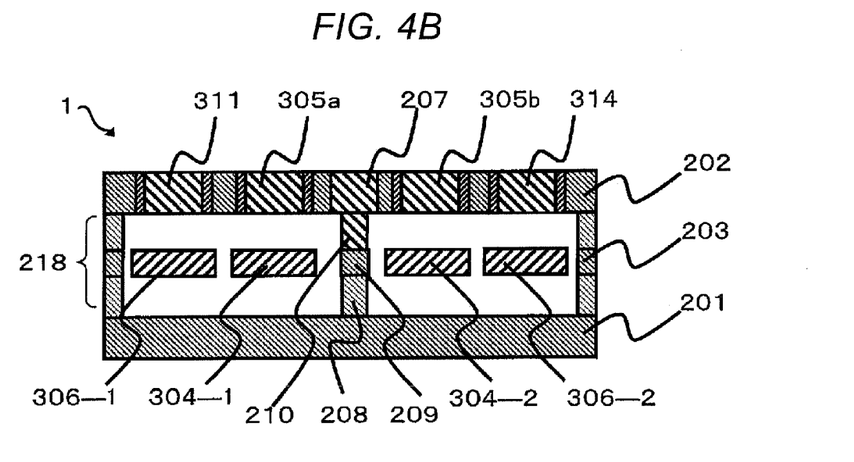
FIG. 4B is a sectional view of the inertial sensor applied with the present invention.

In FIGS. 4A and 4B, in a first movable part 304, a first region 304-1 and a second region 304-2 are formed X-axis symmetrically with respect to an elastic beam 312. A second movable part 306 is connected to the first region 304-1 via an elastic beam 313.

In the second movable part 306, a first region 306-1 opposed to a diagnosis electrode 311 and a second region 306-2 opposed to a diagnosis electrode 314 are formed X-axis symmetrically with respect to the elastic beam 312 and formed X-axis asymmetrically with respect to the elastic beam 313.

The first movable part 304 is rotatable with the elastic beam 312 set as a rotation axis and the second movable part 306 is rotatable with the elastic beam 313 set as a rotation axis. The center of gravity of the first movable part 304 is shifted to a −X side with respect to the elastic beam 312 because the second movable part 306 is connected to only the first region 304-1. On the other hand, the center of gravity of the second movable part 306 is shifted to a +X side with respect to the elastic beam 313 because the second region 306-2 is further away from the elastic beam 313, which is the rotation axis, than the first region 306-1.

Therefore, the first movable part 304 and the second movable part 306 shown in FIGS. 4A and 4B rotate in directions opposite to each other in the detecting direction when an inertial force in the detecting direction is applied. In the detecting direction, in particular, when an inertial force is applied in a +Z direction and when an inertial force is applied in a −Z direction, the first movable part 304 and the second movable part 306 also respectively rotate in opposite directions.

It is assumed that a self-diagnosis is applied to such an MEMS element. For example, when a predetermined voltage is applied to the diagnosis electrode 311, the first region 306-1 of the second movable part 306 rotates by being attracted to the diagnosis electrode 311. The first movable part 304 also rotates according to the rotation of the first region 306-1 (the direction of the rotation is a direction opposite to the direction of the second movable part 306). On the other hand, when a predetermined voltage is applied to the diagnosis electrode 314, the direction of the rotation of the second movable part 306 is reversed. Therefore, the direction of the rotation of the first movable part 304 is also reversed. That is, the direction of the rotation of the first movable part 304 can be set in opposite direction when a voltage is applied to the diagnosis electrode 311 and when a voltage is applied to the diagnosis electrode 314. Therefore, a diagnosis can be performed by one of the diagnosis electrodes 311 and 314 when an inertial force is applied in the +Z direction. A diagnosis can be performed by the other when an inertial force is applied in the −Z direction.

As explained above, the inertial sensor shown in FIGS. 4A and 4B includes the first and second diagnosis electrodes, which are the electrodes opposed to the second movable part 206 and used for a diagnosis of the inertial sensor. The first diagnosis electrode and the second diagnosis electrode are provided symmetrically with respect to the rotation axis 216. With such a characteristic, it is possible to diagnose the inertial sensor when inertial forces in the out-of-plane direction are applied, in particular, when an inertial force in the +Z direction is applied and when an inertial force in the −Z direction is applied. Therefore, it is possible to realize a more reliable inertial sensor.

Third Embodiment

The configuration of an inertial sensor according to a third embodiment is explained with reference to FIGS. 5A and 5B.

Figure 5A:
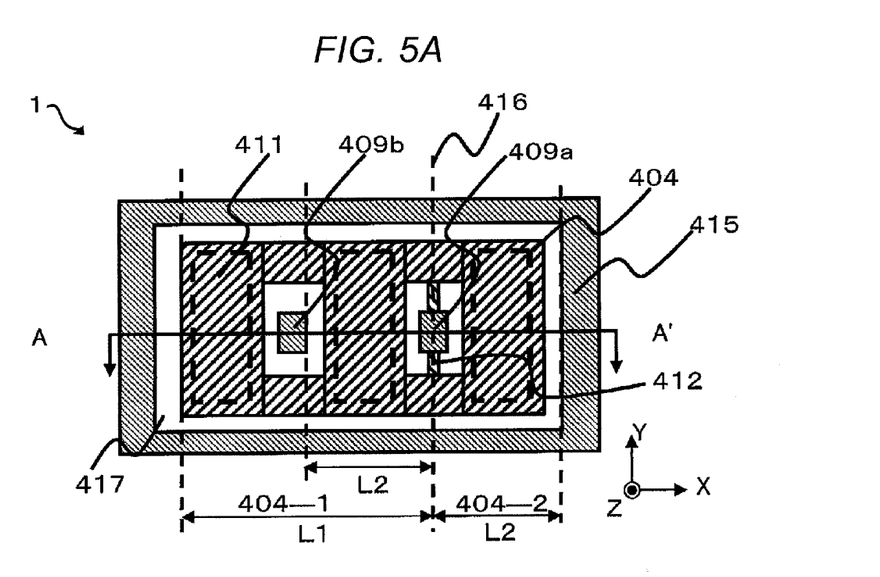
FIG. 5A is a plan view of the inertial sensor applied with the present invention.

FIG. 5A is a sectional view in an XY plane including a movable part 404 of the MEMS element 1 in this embodiment. Portions of the movable part 404 opposed to detection electrodes 405a and 405b and a diagnosis electrode 411 are indicated by dotted lines. FIG. 5B is a sectional view in an XZ plane of the MEMS element 1 shown in FIG. 5A taken along a line A-A'.

Figure 5B:
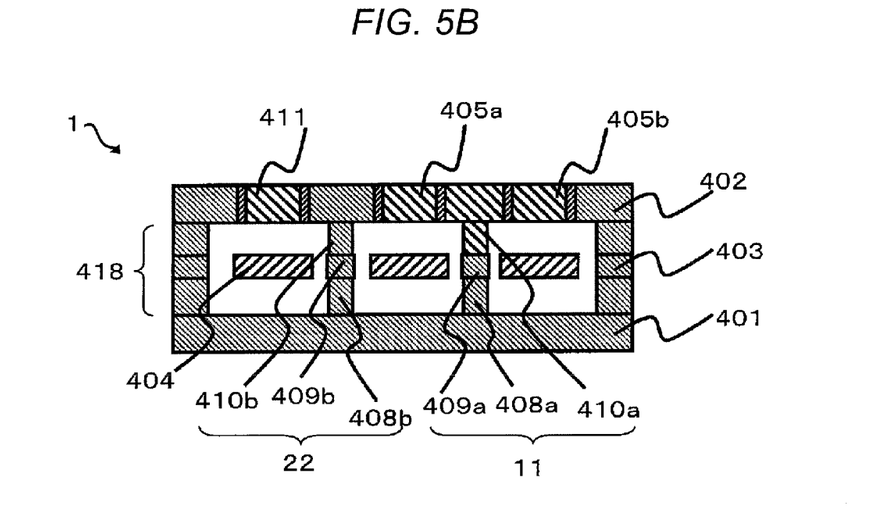
FIG. 5B is a sectional view of the inertial sensor applied with the present invention.

In the MEMS element 1 shown in FIGS. 5A and 5B, three silicon wafer substrates 401, 402, and 403 form a three-layer structure same as the three-layer structure in the first embodiment.

On the other hand, the third embodiment is different from the first embodiment in that the MEMS element 1 includes two supports 11 and 22. As in the first embodiment, the support 11 is a support including supporting sections 408a, 409a, and 410a that support the movable part 404. On the other hand, the support 22 is a support including supporting sections 408b, 409b, and 410b and is a support that does not support the movable part 404. The support 22 is a support for supporting a section between the silicon wafer substrates 401 and 402 and suppressing deformation of a cavity. The support 22 is provided in a position where the distance from the support 11 to a frame body 415 and the distance from the support 11 to the support 22 are equal.

The movable part 404 is formed by the silicon wafer substrate 403 and rotatable via an elastic beam 412. The movable part 404 is formed such that the distance from the elastic beam 412 to an end of a first region 404-1 and the distance from the elastic beam 412 to an end of a second region 404-2 are different. The movable part 404 is formed Y-axis symmetrical with respect to the line A-A'. The third embodiment is different from the first embodiment in that the movable part 404 is formed to surround the support 22 that is not in contact with the movable part 404.

The detection electrodes 405a and 405b are formed X-axis symmetrical with respect to a rotation axis 416. On the other hand, a cavity 417 is asymmetrical in the X-axis direction with respect to the rotation axis 416. This seems to be the condition under which the asymmetrical distortion occurs explained with reference to FIG. 8. However, the cavity 417 according to this embodiment is separately supported by the support 22. Consequently, a region from the rotation axis 416 to the support 22 and a region from the rotation axis 416 to the frame body 415 function as a cavity X-axis symmetrical with respect to the rotation axis 416.

As explained above, the inertial sensor according to this embodiment is an inertial sensor including the movable part 404 in the cavity surrounded by the first substrate 401, the second substrate 402 provided above the first substrate 401, and a sidewall 418, the inertial sensor including the first support 11 provided in contact with the first substrate 401 and the second substrate 402 to support the movable part 404 and the second support 22 provided in contact with the first substrate 401 and the second substrate 402 and not in contact with the movable part 404. The movable part 404 is a movable part configured to rotate about the rotation axis 416, which passes through the first support 11, when an inertial force in the detecting direction (the Z-axis direction) is applied to the inertial sensor. The movable part 404 includes the first region 404-1 and the second region 404-2 displaced in a direction opposite to the direction of the first region 404-1 when the inertial force is applied. The second substrate 402 includes the first detection electrode 405a opposed to the first region 404-1 and the second detection electrode 405b opposed to the second region 404-2. The first detection electrode 405a and the second detection electrode 405b are provided symmetrically with respect to the rotation axis 416. In the direction (the X-axis direction) perpendicular to the detecting direction and a direction in which the rotation axis extends, the length L1 from the rotation axis 416 to the end of the first region 404-1 and the length L2 from the rotation axis 416 to the end of the second region 404-2 are different.

With such a characteristic, the inertial sensor according to this embodiment can reduce the influence of deformation of the cavity. Further, unlike the first embodiment, the supporting section (the support 11) of the movable part 404 does not need to be set in the center of the cavity. Therefore, a degree of freedom of arrangement of the movable part is higher and it is easier to cope with a reduction in size.

What is claimed is:

1. An inertial sensor comprising:
   a movable part disposed in a cavity surrounded by a first substrate,
   a second substrate provided above the first substrate,
   a plurality of sidewalls including a first side wall, a second side wall, and other side walls, and
   a support provided in contact with the first substrate and the second substrate to support the movable part, wherein
   the movable part is a movable part configured to rotate about a shaft which is connected to the support, when an inertial force in a detecting direction is applied to the inertial sensor, the shaft having a longitudinal axis;
   the movable part including a first region and a second region displaced in a direction opposite to a direction of the first region when the inertial force is applied,
   the second substrate includes a first detection electrode opposed to the first region and a second detection electrode opposed to the second region,
   the first detection electrode and the second detection electrode are provided symmetrically with respect to the longitudinal axis of the shaft,
   the first and second regions each have a distal end that is farthest from the longitudinal axis of the shaft,
   a distance from the longitudinal axis of the shaft to the distal end of the first region is different from a distance from the longitudinal axis of the shaft to the distal end of the second region,
   a distance from the longitudinal axis of the shaft to the first side wall, which is adjacent to the distal end of the first region, is the same as a distance from the longitudinal axis of the shaft to the second side wall, which is adjacent to the distal end of the second region,
   the longitudinal axis of the shaft extends through the other side walls rather than through the first and second side walls, and
   the cavity is X-axis symmetrical with respect to the support, so that the cavity is symmetrical with respect to a rotation axis that passes the support, such that a dimension of the cavity, along the X-axis, on either side of the support, is the same.

2. The inertial sensor according to claim 1, wherein
   the length from the longitudinal axis of the shaft to the end of the second region is larger than the length from the longitudinal axis of the shaft to the end of the first region, and
   the second substrate includes a diagnosis electrode that is opposed to the second region.

3. The inertial sensor according to claim 1, further comprising a mold resin package set in contact with the second substrate.

4. The inertial sensor according to claim 1, wherein the first substrate, the second substrate, and the movable part are formed of silicon.

5. The inertial sensor according to claim 1, wherein the inertial force is acceleration in the detecting direction.

6. The inertial sensor according to claim 1, wherein longitudinal axes of the first side wall and of the second side wall extend along a direction that is more similar to a direction of the longitudinal axis of the shaft than to a direction of another axis that is perpendicular to the longitudinal axis of the shaft.

7. The inertial sensor according to claim 6, wherein the longitudinal axis of the shaft is parallel to: i) the longitudinal axis of the first side wall, and ii) the longitudinal axis of the second side wall.

* * * * *